United States Patent [19]

Hardin et al.

[11] Patent Number: 5,001,304
[45] Date of Patent: Mar. 19, 1991

[54] BUILDING RISER CABLE

[75] Inventors: Tommy G. Hardin, Lilburn; Behrooz A. Khorramian, Norcross, both of Ga.

[73] Assignee: AT&T Bell Laboratories, Murray Hill, N.J.

[21] Appl. No.: 384,953

[22] Filed: Jul. 25, 1989

[51] Int. Cl.$^5$ .............................................. H01B 7/34
[52] U.S. Cl. ................................ 174/107; 174/121 A
[58] Field of Search .......................... 174/107, 121 A

[56] References Cited

U.S. PATENT DOCUMENTS

| | | | |
|---|---|---|---|
| 3,006,787 | 10/1961 | Blewis et al. | 174/121 A |
| 4,273,821 | 6/1981 | Pedlow | 174/121 A |
| 4,412,094 | 10/1983 | Dougherty et al. | 174/121 A X |
| 4,510,346 | 4/1985 | Bursh, Jr. et al. | 174/107 X |
| 4,549,041 | 10/1985 | Shingo et al. | 174/121 A X |
| 4,605,818 | 8/1986 | Arroyo et al. | 174/121 A X |
| 4,664,472 | 5/1987 | Mayr et al. | 350/96.23 |
| 4,722,959 | 2/1988 | Inoue et al. | 174/110 PM X |
| 4,853,154 | 8/1989 | Icenogle et al. | 174/121 A X |
| 4,869,848 | 9/1989 | Hasegawa et al. | 174/121 A X |

FOREIGN PATENT DOCUMENTS

| | | |
|---|---|---|
| 328051 | 8/1989 | European Pat. Off. . |
| 380244 | 8/1990 | European Pat. Off. . |
| 3334730 | 10/1984 | Fed. Rep. of Germany . |
| 30118 | 3/1980 | Japan ........................... 174/121 A |

*Primary Examiner*—Morris H. Nimmo
*Attorney, Agent, or Firm*—E. W. Somers

[57] ABSTRACT

A cable which may be used in buildings in riser shafts includes a core (22) which includes at least one transmission medium which is enclosed in a non-halogenated plastic material. The core is enclosed with a jacket (29) which also is made of a non-halogenated plastic material. The non-halogenated material which encloses the transmission medium is a plastic material selected from the group consisting of a filled polyolefin, a polyphenylene oxide, a polyetherimide and a silicone-polyimide copolymer, and blend compositions of a polyetherimide and a silicone-polyimide copolymer. For the jacket, the plastic material comprises a filled polyolefin.

11 Claims, 3 Drawing Sheets

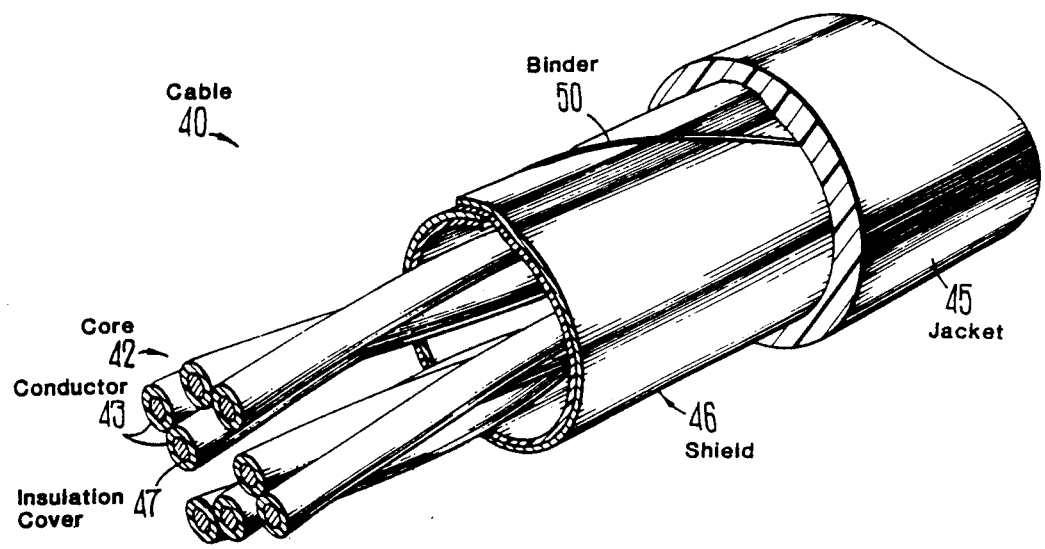
FIG 4
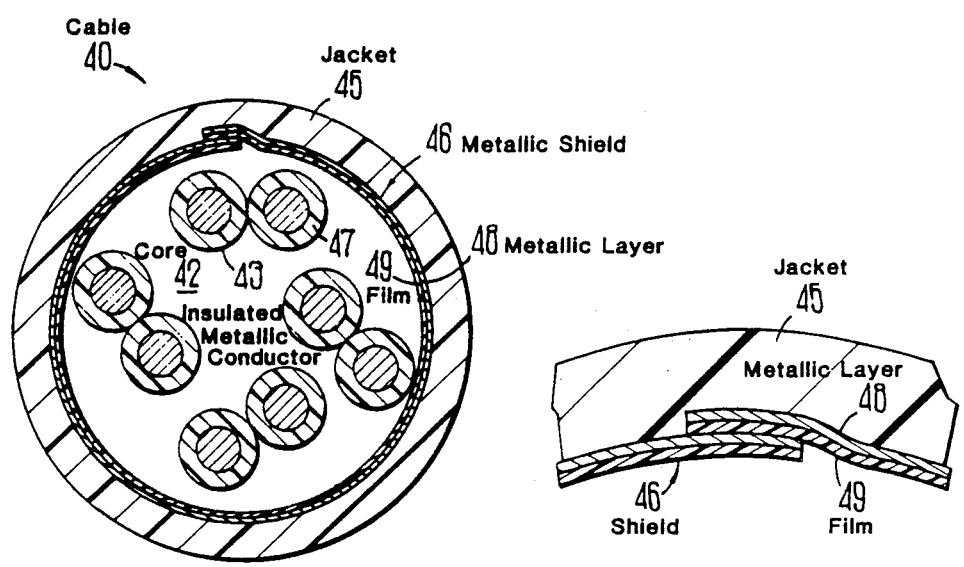
FIG 5  FIG 6

BUILDING RISER CABLE

TECHNICAL FIELD

This invention relates to a riser cable for use in buildings. more particularly, the invention relates to a riser cable which includes non-halogenated plastic materials.

BACKGROUND OF THE INVENTION

Telephone service within buildings is provided by cables some of which are referred to as rise cables. These cables generally used to interconnect between equipment closets located on various floors or to extend from vaults in basements to other floors. Risers are employed mainly for vertival runs between floors within buildings. They may extend between service entry locations, equipment closets, and equipment to other building floors where they are connected to plenum cables distribution cables, distribution equipment centers or directly to equipment such as computers, telephone or facsmile apparatus, for example. Typically, a riser cable includes a core having a plurality of optical fibers or a plurality of twisted pairs of metallic conductors which are individually enclosed with an insulation cover. the core is enclosed in a sheath.

Because of the environment in which these riser cables are used, they must meet specified requirements which relate to fire-retardancy and mechanical integrity. Besides plenum cable, there are four categories of flame test requirements for cables which may be used in building applications. First there is the riser class and a cable qualifying for same must meet the requirements of Underwriters Laboratories, Inc. (UL) 1666 flame test. Another standard is that of the Canadian Standards Association which require that any candidate cable meets the requirement of its FT-4 test. There is a general use class in which the candidate cable should meet the requirements of a general purpose test embodied in UL 1581 vertical tray flame test. A fourth category is referred to as VW-1 which defines a standard for a vertical transmission medium for residential use. These flame test requirements are less stringent than those for plenum cable.

Another consideration is the pair count density, which is the number of insulated conductors in a given cable cross-section. With the trend toward larger and larger buildings and the increased use of the telephone for various kinds of communication, the pair count density within a building riser system may be greater than that in the past.

Also of importance to building cables is the capability of color coding the conductor insulation. Typically, a predetermined number of conductor pairs are grouped together in what is referred to as a unit. The unit is characterized by unique color combinations among the pairs as well as a binder having a particular color. This allows an installer to be able to identify a particular conductor pair and to distinguish between tip and ring. As a result of the relative ease of identification, splicing and termination costs are greatly reduced.

The prior art has addressed the problem of cable materials that contribute to flame spread and smoke evolution through the use of halogenated materials such as fluoropolymers and polyvinyl chloride (PVC). For example, these together with layers of other materials, have been used to control char development, jacket integrity and air permeability to minimize restrictions on choices of materials for insulation within the core in a plenum cable. Commercially available flourine-containing polymer materials have been accepted as the primary insulative covering for conductors and as a jacketing material for plenum cable without the use of metal conduit. In one prior art small size plenum cable, disclosed in U.S. Pat. No. 4,605,818 which issued on Aug. 12, 1986 in the name of C. J. Arroyo, et al., a sheath system includes a layer of a woven material which is impregnated with a fluorocarbon resin and which encloses a core. The woven layer has an air permeability which is sufficiently low to minimize gaseous flow through the woven layer and to delay heat transfer to the core. An outer jacket of an extrudable fluoropolymer material encloses the layer of woven material. In the last-described cable design, a substantial quantity of flourine , which is a halogen, is used.

Besides flouropolymers, other halogenated material such as chlorine-containing polymers e.g. PVC, are also used for both insulation and jacket. One such cable is disclosed in U.S. Pat. No. 4,412,094 which issued on Oct. 25, 1983 in the names T. S. Dougherty, et al. In it, a riser cable is disclosed to have conductors insulated with a composite insulation comprising an inner layer of an expanded polyethylene and an outer layer of PVC. A PVC jacket encloses the core.

Although the PVC is very attractive in terms of cost, when it is compared with other polymers, namely, flourinated polymers, it has relatively high dielectric properties which make it insuitable for high frequency applications. In addition, some PVC materials exhibit a relatively high degree of corrosivity and smoke generation in fire situations although others which are highly filled with halogenated materials are acceptable for plenum use.

The problem of acceptable building cable design is complicated somewhat by a trend to the extension of the use of optical fiber transmission media from a loop to building distribution systems. Not only must the optical fiber be protected from transmission degradation, but also it has properties which differ significantly from those of copper conductors and hence requires special treatment. Light transmitting optical fibers are mechanically fragile, exhibiting low strain fracture under tensile loading and degraded light transmission when bent with a relatively low radius of curvature. The degradation in transmission which results from bending is known as microbending loss. This loss can occur because of coupling between the jacket and the core. Coupling may result because of shrinkage during cooling of the jacket and because of differential thermal contractions when the thermal properties of the jacket material differ significantly from those of the enclosed optical fibers.

The use of fluoropolymers, with or without underlying protective layers, for optical fiber building cable jackets requires special consideration of material properties such as crystallinity, and coupling between the jacket and an optical fiber core which can have detrimental effects on the optical fibers. If the jacket is coupled to the optical fiber core, the shrinkage of fluoropolymer plastic material, which is semi-crystalline, following extrusion puts the optical fiber in compression and results in microbending losses in the fiber. Further, its thermal expansion coefficients relative to glass are large, thereby comprising the stability of optical performance over varying thermal operating conditions. Also, the use of some fluoropolymers requires special care for processing and adds to cost of the cables.

Although there exists cables which include halogen materials and which have passed the UL test requirements, there has been a desire to overcome some problems which still exist with respect to the use of some fluoropolymer and PVC halogenated materials. Both these materials may exhibit undesired levels of corrosion. If a fluoropolymer is used, hydrogen flourife forms under the influence of heat, causing corrosion. For a PVC, hydrogen chloride is formed. Futher, some PVC materials exhibit an undesired level of smoke generation.

Generally, there are a number of halogenated materials which pass the industry tests for building cable. However, if some halogenated materials have undesirable characteristics and industry demands certain characteristics that halogenated materials are lacking, it is logical to inquire as to why non-halogenated materials have not been more widely used for building cable materials. the prior art has treated non-halogenated materials as unacceptable because as a genral rule it has been said that they are not as flame retardant or because they are too inflexible if they are flame retardant. Materials for use in communications cables for building applications must be such that the resulting cable passes an industry standard flame test, which for riser cables, is the hereinbefore mentioned UL 1666 test. In addition, the cable should pass physical and mechanical test set forth by UL as well as transmission requirements set forth by manufacturers such as AT&T.

Non-halogenated materials have been used in countries outside the United States particularly in the less stringent categories for building cable. One example of a non-halogenated material that has been offered as a material for insulating conductors is a polyphenylene oxide plastic material. Ongoing efforts have been in motion in the United States to provide non-halogenated material which has a broad range of acceptable properties, as well as a reasonable price, and yet one which passes industry standards such as the UL 1666 test for riser cables. Such a cable should be one which appeals to a broad spectrum of customers.

One such cable for plenum applications is that disclosed in copending commonly assigned application Ser. No. 07/303,212 which was filed on Jan. 27, 1989 in the names of T. G. Hardin and B. A. Khorramian. In it is disclosed a cable in which transmission media are enclosed in a covering material which is selected from the group consisting of a polyetherimide, a polymide, a silicone-polymide copolymer and blend compositions of a polyethermide and a silicone-polymide copolymer. A jacket which encloses the transmission material is a plastic material which includes a polythermide constituent. The cable of the aforementioned application meets UL 910 test requirements for plenum cable exhibits relatively low corrosivity and a suitable toxicity level. However, the materials which are used for insulation and jacketing require somewhat more care to process than conventional cable materials such as polyethylene and PVC. Also, such a cable, although suitable for riser cable, far exceeds the requirements for same. In addition, such a plenum cable costs considerably more than what is perceived to be reasonable for riser cables, a situation which is well received by the customer.

The sought-after riser cables not only exhibit suitably low flame spread producing characteristics provided by a currently used cables which include halogenated materials but also one which meets a broad range of desired properties such as low smoke generation, acceptable levels of corrosivity and toxicity and which is reasonable in cost. Such a riser cable does not appear to be available in the prior art. The challenge is to provide such a cable which meets the standards in the United States for riser cables.

what is needed is an insulation and jacketing system for a riser cable which minimizes the opportunity for the beginning of a fire alon the cable, and should such a flame be initiated, one which minimizes the propagation of the flame and the total heat which is released by the cable system. Also, the sought-after insulation not only must have a relatively small diameter-over-dielectric in order to reduce the outside diameter of the cable, but must also must lend itself to a color coding scheme in order to facilitate inside wiring and splicing.

What is needed and what does not appear to be available is a building cable which meets the requirements of Ul tests for riser applications. The sought-after cable desirably is one which uses non-halogenated insulating and jacketing materials, yet in one which satisfies the UL requirements for use in building risers at a reasonable cost with excellent transmission characteristics.

SUMMARY OF THE INVENTION

The foregoing problems of the prior art have been overcome with the cables of this invention. A cable of this invention comprises a core which includes at least one transmission medium. For communications use, the transmission medium may include optical fiber or metallic conductors. the transmission medium is enclosed with a plastic material and a jacket which comprises a plastic material encloses the at least one transmission medium. The plastic material which encloses the at least one transmission medium is a plastic material which may be a filled polyolefin, a polyphenylene oxide, a polyetherimide, a silicon-polyimide copolymer or blends of the latter two materials. The jacket comprises a filled polyolefin material.

Advantageously, the cables of this invention may be used in building risers and are acceptable by UL 1666 flame requirements. Further, they exhibit relatively low levels of smoke generation and relatively low corrosivity, as well as a suitable level of toxicity.

BRIEF DESCRIPTION OF THE DRAWING

Other features of the present invention will be more readily understood from the following detailed description of specific embodiments thereof when read in conjunction with the accompanying drawings, in which:

FIGS. 4 and 5 are perspective and end cross sectional views of an alternate embodiment of a cable of this invention with spacing among pairs of conductors being exaggerated; and FIG. 6 is a detail view of a portion of the cable of FIGS. 4 and 5.

DETAILED DESCRIPTION

Figure 1:
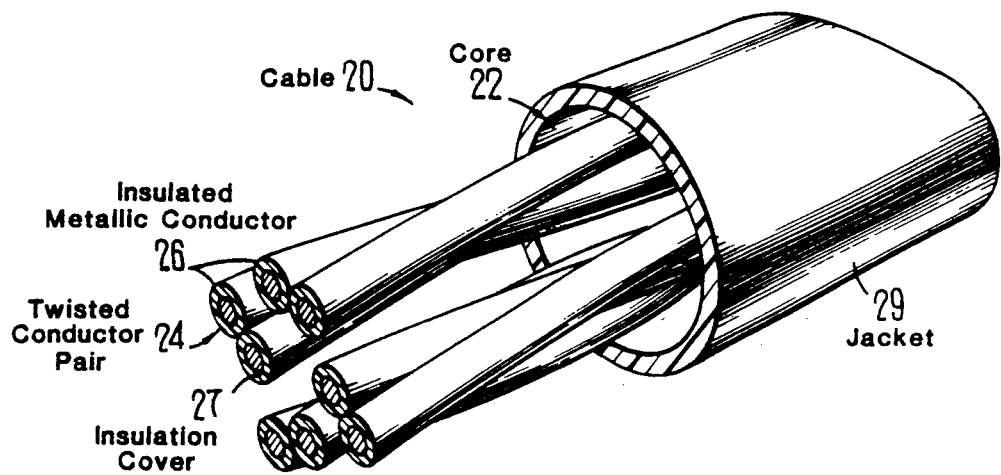
FIG. 1 is a perspective view of a cable of this invention.
Figure 2:
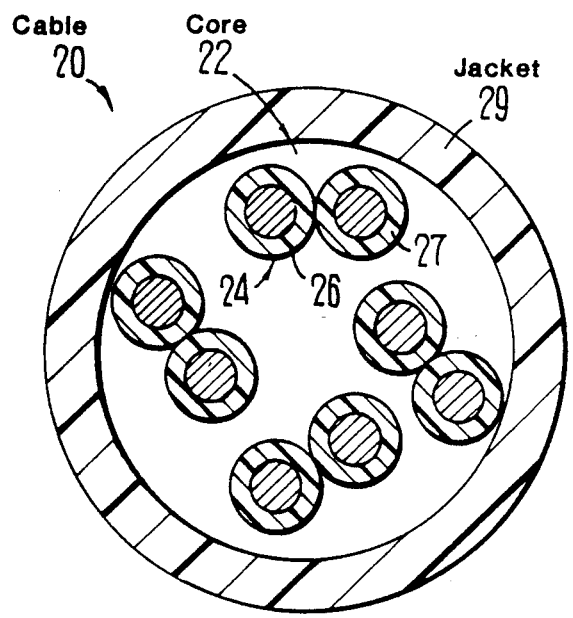
FIG. 2 is an end cross-sectional view of the cable of FIG. 1 with spacing among pairs of conductors being exaggerated.
Figure 3:
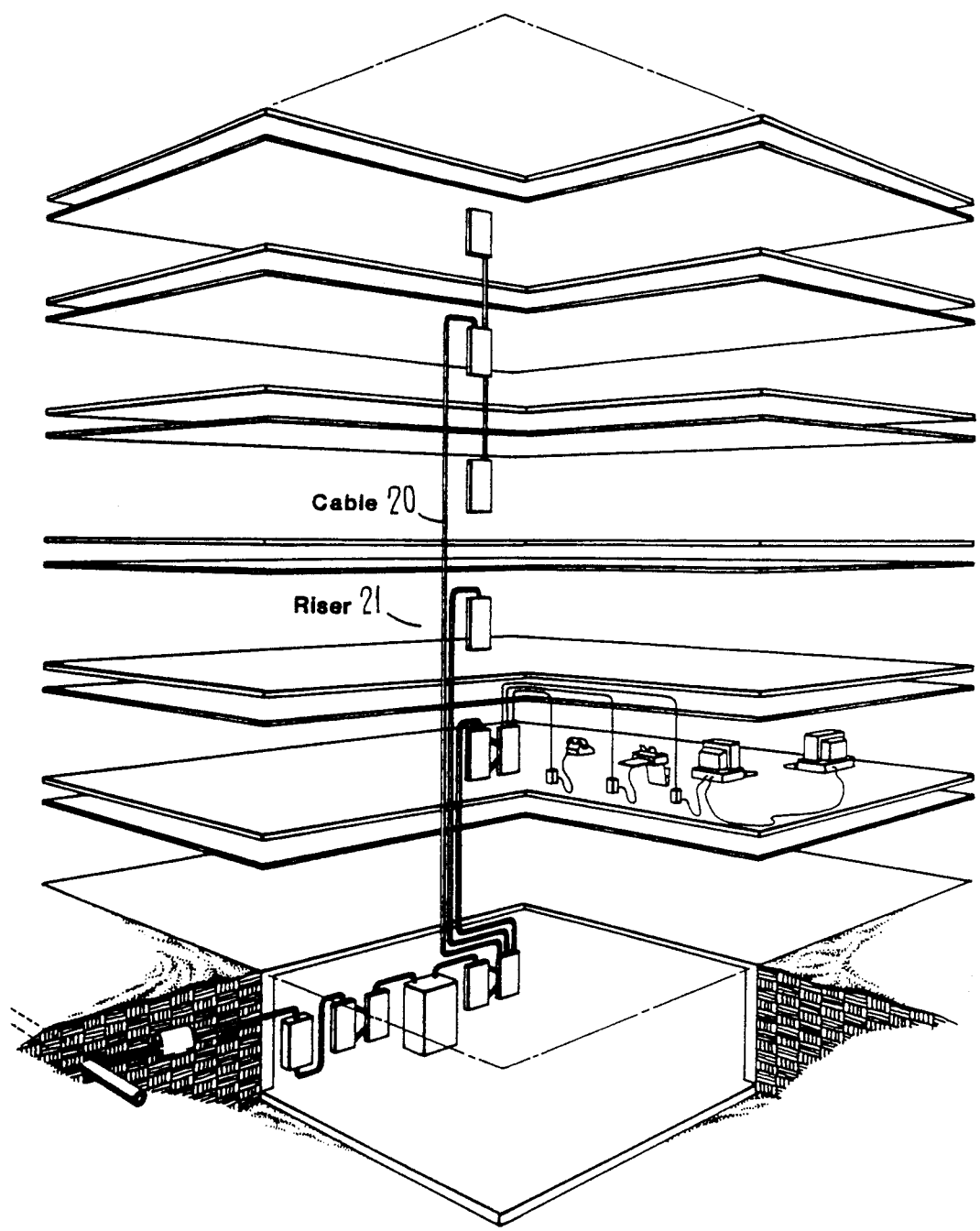
FIG. 3 is an elevational view of a building which includes a riser, depicting the use of cables of this invention.

Referring now to FIGS. 1 and 2 there is shown a cable which is designated generally by the numeral 20 and which is capable of being used in buildings in risers. A typical building riser 21 is depicted in FIG. 3. There, a cable 20 of this invention is disposed in the riser 21. As can be seen in FIGS. 1 and 2, the cable 20 includes a core 22 which comprises at least one transmission medium. The transmission medium may comprise metallic insulated conductors or optical fiber. Also, the core 22 may be enclosed by a core wrap (not shown). the core 22 may be one which is suitable for usae in data, computer, alarm and signaling networks as well as in voice communication.

For purposes of the description hereinafter, the transmission medium comprises twisted pairs 24—24 of insulated metallic conductors 26—26. Although some cables which are used in building riser shafts may include as many as several thousand conductor pairs, many such cables includes as few as six, four, two or even single conductor pairs.

In order to provide the cable 20 with flame retardancy, suitable toxicity, low corrosivity and low smoke generation properties, the metallic conductors are insulated with a platic material which provides those properties. The metallic conductors are provided with an insulation cover 27 which is selected from the group consisting of a filled polyolefin, a polyphenylene oxide, a polyetherimide, a silicone-polyimide copolymer, or blend compositions of a polyetherimide and a silicone-polyimide copolymer. A preferred embodiment includes conductors which are insulated with a filled polyolefin material.

A polyolefin is a polymeric material comprising mainly hydrogen and carbon. Examples of polyolefins suitable for use in cables of this invention include polyvinyl acetate and a copolymer of ethylene and butene.

Filler constituents which may be used with the polyolefin to enhance the flame retardancy of the material include antimony trioxide and metal hydroxides, for example. Examples of metal hydroxides which are suitable for the filled polyolefin composition include magnesium hydroxide and aluminum hydroxide, for example. In one filled polyolefin, the composition includes about 5% by weight of antimony trioxide whereas in another, the composition includes about 20% by weight to about 70% by weight of magnesium hydroxide. Further, a filled polyolefin may be a composition comprising a polyolefin, antimony trioxide and a metal hydroxide with the combined weight of the antimony trioxide and the metal hydroxide not exceeding about 70% by weight of the filled polyolefin composition.

Polyetherimide is an amorphous thermoplastic resin which is available commercially from the General Electric Company under the designated ULTEM ® resin. The resin is characterized by high deflection temperature of 200° C. at 264 psi, a relatively high tensile strength and flexural modulus and very good retention of mechanical properties at elevated temperatures. It is inherently flame resistant without the use of other additions and has a percent limiting oxygen index (LOI) in the range of 44 to 47. Limiting oxygen index indicates the degree of flame retardancy of a material. The higher the LOI, the more flame retardant the material.

Polyetherimide is a polyimide having other linkages incorporated into the polyimide molecular chain to provide sufficient flexibility to allow suitable melt processability. It retains the aromatic imide characteristics of excellent mechanical and thermal properties. Polyethermide is described in an article authored by R. O. Johnson and H. S. Burlhis entitled "Polyethermide: A New High-Performance Thermoplastic Resin" which appeared beginning at page 129 in the 1983 Journal of Polymer Science.

Polyphenylene oxide is available commercially, for example, under the designation Noryl ® plastic material from the General Electric Company. Properties of this material include a limiting oxygen index of 32.

As mentioned, the insulation may be a silicone-polyimide copolymer. A suitable material is a silicone-polyetherimide copolymer which is a copolymer of siloxane and etherimide. A silicone-polyimide copolymer such as SILTEM TM copolymer which is marketed by the General Electric Company is a flame resistant, nonhalogenated containing thermoplastic. It has a tensile strength of 4000 psi and a Gardner impact of 120 inch pounds. Further, the silicone-polyimide copolymer has an oxygen index of 46.

In the blend compositions, the polyetherimide may range from about 0 to about 100% by weight of the composition. The silicone-polyimide composition also may range from about 0% to about 100% by weight of the compositions.

About the core is disposed a jacket 29. The jacket 29 is comprised of a filled polyolefin which also may be used as the insulation cover for the metallic conductors. For expected pair sizes, the jacket 29 typically has a thickness of about 0.023 inch.

In another embodiment, a cable 40(see FIGS. 4 and 5) includes a core 42 which comprises transmission media such as twisted pairs of metallic conductors 43—43 and a jacket 45. Interposed between the core 42 and the jacket is a laminated metallic shield 46 with or without a core wrap (not shown). Each of the conductors 43—43 is provided with an insulation cover 47 which comprises a filled polyolefin, a polyphenylene oxide, a polyetherimide, a silicone-polyimide copolymer or blends thereof with each constituent of the blend composition ranging from about 0% to 100% by weight. The jacket 45 comprises a filled polyolefin.

The shield 46 preferably is a laminate which includes a metallic layer 48 (see FIG. 6) and a film 49 which is adhered to the metallic layer. The film comprises plastic material such as polyester, a polyetherimide, a polyimide, a silicone-polyimide copolymer or a blend of a polyetherimide and a silicone-polyimide copolymer. In the blend, the polyetherimide may range from about 0% to 100% by weight of the blend constituents. In a preferred embodiment, the thickness of each of the layers of the laminate is 0.001 inch.

It is important that the shield remain wrapped about the core. This is accomplished by wrapping a binder 50 (see FIG. 4) about the shield after the shield has been wrapped about the core. The binder may be comprised of fiberglass or aramid fiber or other flame retardant materials.

Although the cables of this invention have been disclosed thus far as including twisted pairs of metallic conductors, it is within the scope of the invention to provide a cable which includes a core comprising optical fibers. The optical fibers may be arrayed about a centrally disposed organizer. For optical fiber cables in which the optical fibers are provided with a buffer layer, a silicone-polyimide copolymer has more flexibility than a polyetherimide thereby reducing the possibility of inducing microbending loss into the optical fibers. The core may be enclosed in a strength member system and in a jacket.

In the past, the cable industry in the United States evidently has shield away from the use of non-halogenated materials for use in building cables. Those non-halogenated materials which possess desired flame retardance and smoke generation properties seemingly were too inflexible to be used in such a product whereas those non-halogenated materials which had the desired amount of flexibility did not meet the relatively high United States standards for building cables such as plenum, for example. What is suprising is that the insulation and jacketing materials of the cables of this invention include non-halogenated materials and meet all National Electric Code (NEC) requirements for riser use. Further, at least the cables of the preferred embodiment are sufficiently flexible to meet low temperature bend tests which are standard in the industry for cables.

Suprisingly, the cables of this invention which include non-halogenated insulation and jacketing materials that meet acceptable standards for flame retardancy for riser use also have low smoke generation, relatively low corrosivity and a suitable level of toxicity as measured by a toxicity test developed by the University of Pittsburgh. In this test, a parameter referred to as $LC_{50}$ which is the lethal concentration of gases generated from the burning of a material which causes a 50% mortality among an animal population, that is, 2 out of 4 test animals, for example, is measured. $LC_{50}$ is an indication of the toxicity of a material caused by smoke generated upon its burning. The higher the value of the $LC_{50}$, the lower the toxicity. A higher value indicates that more material must be burned to kill the same number of test animals. It is important to recognize that $LC_{50}$ is measured for the plastic material used in the cable without the metallic conductors.

These results are surprising and unexpected because it has long been thought that non-halogenated materials would not provide at least the same flame retardancy and smoke generation which are provided by halogenated materials and which satisfy industry standards in the United States. The conductor insulation and the jacketing material cooperate to provide a system at reasonable cost for riser use which delays the transfer of heat to the transmission members. Because conductive heat transfer, which decomposes conductor insulation, is delayed, smoke emission and further flame spread are controlled.

Tests have shown that heat is transferred into the cable core 22 principally by thermal radiation, secondly by conduction and finally by convection. Flame spread and smoke evolution characteristics of cables may be demonstrated by using the well known Steiner Tunnel test in accordance with ASTM E-84 as modified for communications cables and now referred to as the UL 910 test. The UL 1666 test for cables which are rated for riser use is less stringent than those for plenum use, For example, flame height must not exceed twelve feet with the temperature at the top of the heat column not exceeding a value of 850° F. The flame height of cables of this invention when subjected to UL 1666 test is less than 12 feet. There is no smoke requirement as yet for riser cable.

Acceptable low smoke generation characteristics has been demonstrated for filled polyolefin materials by the Ul 910 plenum test. In this test, smoke generation is detected within an optical detector located in the exhaust duct of the Steiner Tunnel equipment in accordance with ASTM E-84 as modified for communication cables. Low smoke generation during the riser test has also been demonstrated by modifying riser facilities to add an optical detector at the exhaust duct opening. Maximum optical density of the cables of this invention is less than 0.5.

The suitable toxicity level of riser cables of this invention may be demonstrated by the $LC_{50}$ test described earlier herein. The $LC_{50}$ values of cables of this invention which were tested were higher than those for comparable cables having halogenated insulation and jacketing materials.

Low corrosion characteristics of the cables may be demonstrated by the measurement of the percent of acid gases generated from the burning of the cables. The higher the percent of acid gas generated, the more corrosive is the plastic material which encloses the transmission media. This procedure is currently being used in a United States government military specification for shipboard cables. In that specification, 2% acid gas as measured in terms of hydrogen chloride generated per weight of cable is the maximum allowed. Two riser cables of this invention exhibited between about 0% and 1.6% of acid gas generation.

Test results for example cables of this invention as well as for similar riser cables having halogenated materials for insulation and jacketing are shown in the TABLE hereinafter. Being riser rated, the cables of the TABLE pass the UL 1666 test for flame spread and smoke generation. Example cables were subjected to tests in accordance with priorly mentioned UL 1666 test and exposed to 527,500 BTU per hour (154.5 kW).

TABLE

| PLENUM CABLE EXAMPLE | HALOGENATED 1 | NON HALOGENATED 2 | 3 |
| --- | --- | --- | --- |
| PROPERTY | | | |
| A. Smoke generation max optical density | 3.30 | 0.29 | 0.37 |
| B. Corrosivity % acid-gas generation | 35 | 1.60 | 0 |
| C. $LC_{50}$ (grams) | 24 ± 11 | 49 ± 6 | 33 ± 6 |
| D. Outside Diameter (inch) | 0.175 | 0.187 | 0.208 |
| E. Jacket thickness (inch) | 0.021 | 0.023 | 0.023 |

Each of the cables in the TABLE included four pairs of 24 gauge copper conductors each having a 0.006 inch insulation cover. The insulation and jacket of the cable of Example 1 comprised PVC. The insulation and jacket of Example Nos. 2 and 3 were comprised of a filled polyolefin. The filled polyolefin for the insulation of Examples 2 and 3 comprised polyvinyl acetate and about 50–70% by weight of magnesium hydroxide. For the jacket materials of Example 2, the filled polyolefin comprised a blend of polyvinyl acetate, about 50-70% by weight of magnesium hydroxide and about 0-5% by weight of antimony trioxide. Example 3 included polyolefin filled with 50-70% by weight of aluminum hydroxide.

Cables of this invention are suitable for use in building risers. They are relatively low in fuel content and easily may be color coded. The cables of this invention include transmission media covers and jackets which have a range of thickness. But in each case, the cables tested not only passed the flame retardancy tests which are required today by the UL 1666 test but also provided relatively low smoke generation, relatively low corrosivity and a suitable toxicity level.

It is to be understood that the above-described arrangements are simply illustrative of the invention. Other arrangements may be devised by those skilled in the act which will embody the principles of the invention and fall within the spirit and scope thereof.

We claim:

1. A communication cable, which comprises:
   a core which comprises at least one transmission medium, said transmission medium being enclosed with a thermoplastic material which is selected from the group consisting of a filled polyolefin, a polyphenylene oxide, a polyetherimide, a silicone-polyimide copolymer, and blend compositions of a polyetherimide and a silicone-polyimide copolymer; and
   a jacket which encloses said core, said jacket comprising a thermoplastic material which comprises a filled polyolefin thermoplastic material.

2. The cable of claim 1, wherein said filled polyolefin plastic materials is a composition which comprises a polyolefin plastic material and a filler constituent which is selected from the group consisting of antimony trixoide, a metal hydroxide, and blend compositions of antimony trioxide and a metal hydroxide.

3. The cable of claim 2, wherein said filler constituent comprises antimony trioxide which comprises five percent by weight of said filled polyolefin plastic material.

4. The cable of claim 2, wherein said filler constituent comprises a metal hydroxide which comprises about 20 to about 70% by weight of said filled polyolefin plastic material.

5. The cable of claim 2, wherein said filler constituent includes aluminum hydroxide.

6. The cable of claim 2, wherein said filler constituent includes magnesium hydroxide.

7. The cable of claim 1, wherein the maximum optical density of the cable is less than 0.5.

8. The cable of claim 1, which also includes a metallic shield which is disposed between said core and said jacket.

9. The cable of claim 5, wherein said shield is a laminate comprising a metallic material and a polyimide film.

10. The cable of claim 8, wherein said shield is a laminate comprising a metallic material and a polyetherimide film.

11. The cable of claim 8, wherein said shield is a laminate comprising a metallic and a polyester film.

* * * * *